3,741,871
PREPARATION OF IMMOBILIZED ENZYMES
Lloyd E. Weeks, Creve Coeur, and John H. Reynolds, St. Louis, Mo., assignors to Monsanto Company, St. Louis, Mo.
No Drawing. Filed Jan. 4, 1972, Ser. No. 215,426
Int. Cl. C07g 7/02
U.S. Cl. 195—63
10 Claims

ABSTRACT OF THE DISCLOSURE

An enzymatically-active, water insoluble composite comprises fibrous cellulose, a polyamine covalently attached to the cellulose by a carbamic linkage, and an active enzyme crosslinked to the polyamine by an alkylene diamidine linkage. The composite of this invention is useful as a packing for enzyme reactors.

BACKGROUND OF THE INVENTION

This invention relates to immobilized enzymes.

The utility of enzymes as catalysts is well established. Enzyme catalysis may be accomplished through the use of crude enzyme preparations, relatively pure enzyme preparations adsorbed on an inert, solid matrix, enzyme preparations contained within an ultrafiltration membrane system that is permeable to reactants and reaction products but not to the enzyme, and preparations comprising purified enzymes attached to an inert insoluble matrix through a chemical reaction covalently bonding the enzyme to the matrix.

Enzymes immobilized on an inert insoluble matrix by covalent bonding can be used as a reactor core for efficient continuous conversion processes of various substrates. By passing a suitable substrate solution through such an enzyme reactor large quantities of the substrate can be exposed to a fixed quantity of enzyme and thus converted into desired products. The enzymatically-active reactor core can be used for long periods of time and there exists no need for a subsequent separation of the enzyme catalyst from the substrate because the enzyme is retained within the reactor and the coversion reaction is automatically stopped when the substrate solution together with the reaction products exits from the reactor.

In preparing immobilized enzyme composites it is important that the methods utilized to effect covalent bonding of the enzyme to the matrix do not inactivate the enzyme and do not destroy the structural integrity of the matrix. Enzymes are usually quite unstable and cannot be subjected to severe reaction conditions without adversely affecting activity. As to the matrix, in a flow-through reactor the liquid permeability of the reactor core is very important from a practical process standpoint and any damage to the intended matrix should be avoided.

While it is known to immobilize enzymes by covalent bonding to an inert matrix or carrier, the preparation of a matrix which is reactive toward the enzyme yet suitable for use as a flow-through reactor core is often complicated, laborious and expensive. In addition, heretofore known preparations of enzymes insolubilized by covalent bonding to an inert matrix suffer from reduced enzymatic activity, particularly with macrosubstrates such as casein, beer proteins, and the like, because the active enzyme molecule is physically situated so close to the matrix that steric inhibition of enzyme activity vis-a-vis a macrosubstrate molecule is encountered.

It is an object of this invention to obviate the aforementioned difficulties and to provide an enzymatically-active composite wherein steric inhibition of an immobilized enzyme is minimzed.

It is another object to provide a method for firmly bonding an active enzyme to fibrous cellulose, but in a spaced relationship therefrom.

Yet another object of this invention is to provide a method for covalently bonding an active enzyme to fibrous cellulose without subjecting the enzyme to severe reaction conditions.

Still other objects of this invention will readily present themselves to the skilled artisan upon reference to the ensuing specification and the claims.

SUMMARY OF THE INVENTION

The present invention contemplates an enzymatically-active, water-insoluble composite which comprises fibrous cellulose, a polyamine covalently attached to the cellulose by a carbamic linkage, and an active enzyme crosslinked to the polyamine by an alkylene diamidine linkage containing 3 to 10 carbon atoms, inclusive, in the alkylene portion thereof.

The composite of this invention is prepared by reacting in an aqueous medium fibrous cellulose with a cyanogen halide such as BrCN or ClCN so as to produce a pendant iminocarbonic acid ester group on the cellulose, reacting the iminocarbonic acid ester group with a polyamine to covalently attach said polyamine to said cellulose by means of a carbamic linkage, and thereafter coupling a free primary amino group of the attached polyamine and an amino group of an active enzyme which is not essential for enzymatic activity by means of a lower alkyl diester of saturated aliphatic diimidic acid to form an alkylene diamidine linkage between said enzyme and said polyamine.

DESCRIPTION OF THE PREFERRED EMBODIMENTS

For the purposes of the present invention a suitable matrix or carrier is fibrous cellulose or insoluble derivatives thereof such as methylcellulose, carboxymethyl cellulose, viscose, and the like. The term "cellulose" as used herein and in the appended claims is taken to mean cellulose itself and the water-insoluble derivatives thereof.

In preparing the composites of this invention fibrous cellulose is first treated with an aqueous cyanogen halide solution under alkaline conditions. Preferably the pH of the solution is in the range of about 10 to about 13. The concentration of cyanogen halide can vary from about 2 grams per liter to about 50 grams per liter. Preferably the cyanogen halide concentration is in the range from about 15 grams per liter to about 25 grams per liter.

Cyanogen bromide is the preferred reactant; however, cyanogen chloride is also suitable.

During the aforementioned treatment the hydroxyl groups present on the fibrous cellulose react with the cyanogen halide to form a pendant iminocarbonic acid ester group substantially according to the reaction

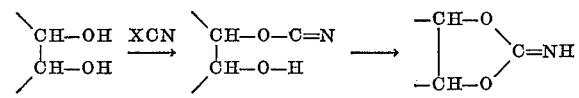

wherein X designates a halogen atom such as chlorine or bromine.

Thereafter the treated cellulose, bearing iminocarbonic acid ester groups, is treated with a polyamine so as to react a primary amino group of the polyamine with the iminocarbonic acid ester group of the cellulose and to form a carbamic linkage between the polyamine and the fibrous cellulose.

The polyamine moiety acts as a spacer for the active enzyme and holds the enzyme sufficiently far away from the cellulose matrix to minimize steric inhibition of enzyme activity. Suitable polyamines for this purpose are the aliphatic diamines represented by the formula

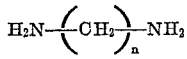

where $n$ is an integer having a value of 3 to 18, inclusive, alkylene dianilines containing 1 to 18 carbon atoms in the alkylene portion thereof, and polyalkylene imines containing primary, secondary and tertiary amino groups and having a molecular weight in the range of about 100 to about 50,000.

Illustrative aliphatic diamines are trimethylene diamine, tetramethylene diamine, pentamethylene, diamine, hexamethylene diamine, octamethylene diamine, hexadecamethylene diamine, octadecamethylene diamine, and the like.

Illustrative alkylene dianilines are methylene dianiline, ethylene dianiline, hexamethylene dianiline, octamethylene dianiline, and the like.

Illustrative polyalkylene imines are those made from condensation of ethylene imine to yield polyethylene imine.

The reaction of the polyamine with the iminocarbonic acid ester group takes place in a neutral or alkaline aqueous medium under relatively mild conditions. The reaction can be carried out at a temperature of about 0° C. to about 20° C. At least a stoichiometric amount of the polyamine for reaction with all of the pendant iminocarbonic acid ester groups present on the cellulose should be present in the reaction mixture. Preferably an excess of the polyamine is employed.

The thus-obtained cellulose matrix having pendant primary amino groups connected to the polysaccharide chain of the cellulose by a relatively long hydrocarbon chain covalently bonded thereto via a carbamic linkage is then coupled to an active enzyme using a lower alkyl diester of saturated aliphatic diimidic acid so as to produce an alkylene diamidine linkage between the enzyme and the polyamine. The diimidic acid can contain 1 to 8 carbon atoms in the alkylene portion thereof. Illustrative crosslinking agents suitable for use in the process of the present invention are the lower alkyl diesters of malonimidic acid, succinimide acid, glutarimidic acid, adipimidic acid, pimelimidic acid, suberimidic acid, and the like. The term "lower alkyl" as used herein and in the appended claims is taken to mean straight or branched chain alkyl moieties containing 1 to 4 carbon atoms, inclusive. That is, dimethyl esters, methylethyl esters, diethylesters, ethylbutyl esters, and the like, of the aforementioned diimidic acids are contemplated.

The active enzyme may be obtained from any suitable source, either vegetable, animal, or microbial. Many such enzymes are available commercially. Typical are the proteases, e.g., neutral and/or alkaline protease. In some instances another differently active enzyme such as amylase, for example, can be admixed therewith to maximize the operative enzyme activity of the composite. Still other enzymes such as a lipase may be used instead of or in addition to the amylase. Additional suitable enzymes are esterase, nuclease, or other types of hydrolase. A hydrase or oxidoreductase may also be employed, or a transferase or isomerase, depending upon the ultimate activity and application intended.

Many such enzymes can conveniently be obtained from microorganisms which include bacteria, yeasts, fungi, and the like, by using well-known fermentation methods such as those generally described in Kirk-Othmer, Encyclopedia of Chemical Technology 8, 173–204. A great many microbially-produced enzymes are available commercially.

The exact activity of the enzymes or enzymes employed as starting material depends on the exact method of preparation and is not critical to the present invention providing only that the enzymatically-active conjugate produced therefrom has the desired enzymatic activity.

Various analytical methods are available to determine the activity of enzymatically-active material. For example, the protease activity of proteolytic enzymes can be determined by well known casein digestion methods. According to such tests, a protease catalyzes the hydrolysis of casein for a certain period of time and temperature and at a certain pH; the reaction is stopped by the addition of trichloroacetic acid, and the solution is filtered. The color of the filtrate is developed by Folin phenol reagent, and the level of enzyme activity is measured spectrophotometrically in units of casein tyrosine. This method is more fully described in the Journal of General Physiology 30, 291 (1947) and in Methods of Enzymology 2, 33 Academic Press, New York (1955). Amylase activity is generally determined by the well-known dinitrosalicylic acid method of Bernfeld. Still other test procedures are known in the art and some are set forth hereinafter.

A particularly effective source of mixed enzymes which can be used as starting material in the present invention is a mutated *Bacillus subtilis* organism. The process for producing this organism and enzymes therefrom is described in U.S. Pat. 3,031,380. A culture of this *Bacillus subtilis* (Strain AM) organism has been deposited with the U.S. Department of Agriculture, Agricultural Research Service, Northern Utilization Research and Development Division, 1815 N. University St., Peoria, Ill. 61604, and has been assigned No. NRRL B–3411. The enzymatically active material produced by this organism has been found generally to consist of two proteases, approximately 65–75% neutral protease (activity at a pH of 7.0–7.5) and about 25–35% alkaline protease (activity at a pH of 9 to 10). A significant amount of amylase is also present. There are generally about 700 thousand to about 1.2 million units of neutral protease activity per gram of isolated solids and about 250 thousand to about 400 thousand units of alkaline protease activity per gram as determined by Anson's Variation of the Kunitz "Casein" method. There are generally about 300 thousand to 350 thousand units of amylase activity per gram as determined by the Bernfeld method. As pointed out in the cited patent, the relative proportions of protease to amylase will vary depending on the exact conditions of growth of the microorganism, but it has been found that the neutral and alkaline protease and the amylase will be produced, in at least some amounts, almost regardless of changes in the culture medium and other conditions of growth of the microorganism.

Another source of mixed enzymes which can be used as starting material in accord with the present invention is *B. subtilis* strain NRRL 644, *B. subtilis* strain NRRL 941, and *B. subtilis* strain IAM 1523 (Japanese Culture Collection). Still other *B. subtilis* microorganisms are available which produce protease, a mixture of proteases, or protease and amylase, at least to a limited if not optimum extent. The so-called *Streptomyces griseus* neutral protease has a broad pH activity range and may constitute one starting enzyme for incorporation into the composites of this invention.

Other typical enzymes are trypsin, chymotrypsin, pepsinogen, carboxypeptidase, rennin, papain, and the like.

Crosslinking of the enzyme to the polyamine occurs via an amino group of the enzyme which is not essential for enzymatic activity. The crosslinking reaction can be carried out in any convenient inert medium, usually an aqueous medium, at pH conditions and temperatures which do not tend to inactivate the enzyme. Temperatures above about 60° C. should generally be avoided. The crosslinking step can be readily carried out at ambient temperatures; however, the temperature of choice depends mainly on the particular enzyme or enzymes employed. Normally the temperature can range from about −5° C. to about 30° C. A temperature in the range of about 0° C. to about 10° C. is preferred.

In order to make a more efficient utilization of the reactants, it is preferable to first couple one end of the crosslinking agent molecule to the amino group of the polyamine and then to couple the enzyme to the other end of the crosslinking agent molecule.

The composites of this invention and the method for preparing these composites are further illustrated by the following examples.

EXAMPLE 1

Activation of cotton with cyanogen bromide

Cyanogen bromide (50 grams) and cold water (2.5 liters) were combined in a four-liter beaker and placed in an ice bath on a magnetic stirrer plate. pH of the solution was immediately brought in the range of 11 to 12.5 by addition of an aqueous 2 N sodium hydroxide solution. Next, chopped clean cotton roving (50 grams, 1 to 2 inches long) was added to the solution and the solution was manually stirred and maintained at a pH of about 11 to 12.5 by the addition of aqueous 2 N sodium hydroxide solution or 2.5 N sodium hydroxide solution. Stirring and the pH were maintained for about one hour at which time the pH stabilized at 12.0. At that time 200 milliliters of 2 N sodium hydroxide solution and 153 milliliters of 2.5 N sodium hydroxide solution had been added.

Thereafter the resulting BrCN-activated cotton was washed eight times with two-liter aliquots of cold water and four times with two-liter aliquots of 0.1 M aqueous sodium bicarbonate solution. Final pH was observed to be 8.4.

During each wash cycle the activated cotton was stirred and after each wash cycle the activated cotton was filtered.

EXAMPLE 2

Attachment of hexamethylene diamine

Cold activated cotton prepared in Example 1, above, was added to hexamethylene diamine (50 grams) in cold 0.1 M aqueous sodium bicarbonate solution (2 liters). The pH of the solution was adjusted to 8.6 by the addition of 4 N aqueous hydrochloric acid solution before the addition of activated cotton took place.

The resulting mixture was stirred in an ice bath for one hour. pH of the mixture was observed to drop rapidly to 8.05.

Thereafter the hexamethylene diamine-treated cotton was washed with stirring and filtered after each wash cycle, followed by the passing of an equal volume of water or solution through the filter. The following wash sequence was used:

(a) water—two liters each time, twice cotton was stirred with two liters of water and filtered, followed by two liters of additional water passed through the filter after each filtration.
(b) 0.05 N HCl—two liters, stirred and filtered, pH of filtrate 2.0.
(c) water—same procedure as in (a).
(d) 0.1 M NaHCO₃—same procedure as in (a).
(e) 0.5 M NaCl—same procedure as in (a).
(f) water—two liters each time, thrice stirred with two liters of water and filtered, followed by two liters of water passed through the filter after each filtration.

The hexamethylene diamine-treated cotton was then stored at about 0° C. to 5° C. for about three days and tested for the presence of amino groups using Crocein Scarlet Moo solution. The test gave substantive red color to the cotton, i.e., the test was positive for amino groups. Untreated cotton subjected to the same test procedure was not dyed. Acetone washed hexamethylene diamine-treated cotton also gave a positive indication for the presence of amino groups.

A sample of hexamethylene diamine-treated cotton was then washed with acetone and dried at 50° C. in a vacuum oven. Test for the presence of amino groups on the dried sample using Crocein Scarlet Moo solution was positive.

Thereafter all of the hexamethylene diamine-treated cotton prepared as set forth hereinabove was washed five times in two liters of acetone with stirring and filtering between wash cycles. After the acetone was dried in vacuum at 50° C. for four hours. Yield: 50.9 grams.

A sample of the hexamethylene diamine-treated cotton was analyzed for nitrogen. An average nitrogen content of about 1.09 percent by weight was found. The analytical results indicate that about 12 to 13 percent of the cotton glucoside units have hexamethylene diamine attached thereto.

EXAMPLE 3

Binding of papain to hexamethylene diamine-treated cotton

Hexamethylene diamine-treated cotton was packed into a stainless steel nipple (1" I.D. x 3") with stainless steel caps and plastic porous discs as fiber retainers fitted at each end of the nipple. The caps were provided with plastic tubing fittings.

Dimethyladipimidate (2.00 grams) was dissolved in water (150 milliliters). Aqueous 1 N sodium hydroxide solution was then added thereto to rapidly bring pH to 10. The resulting solution was then recirculated through the packed hexamethylene diamine-treated cotton at pH 10 for five minutes and at a rate of 132 milliliters per minute. pH was lowered quickly to 6.5 during recirculation in order to slow the reaction. Thereafter, the packed cotton was quickly washed twice by recirculating for five minutes two 2-liter aliquots of water.

Purified papain (2.0 grams) was dissolved in water (200 milliliters) and the pH adjusted to 10 by 1 N aqueous sodium hydroxide solution. This solution was already prepared. The obtained solution was then recirculated without delay through the packed, dimethyladipimidate-treated cotton at pH 10 for 30 minutes at a rate of 132 milliliters per minute.

Thereafter the packed cotton was washed three times with 2-liter aliquots of water by recirculation for five minutes each at a rate of 132 milliliters per minute.

Material balance on the papain remaining in the recirculating solution and the first wash aliquot (2nd and 3rd wash aliquots contained no papain) indicated that about 26 milligrams of papain had been attached per gram of the cotton.

EXAMPLE 4

Evaluation of enzymatic activity

A substrate solution was prepared as follows:

1 M KCl
0.05 M KH₂PO₄
0.003 M disodium salt of ethylenediaminetetraacetic acid (EDTA)
0.003 M cysteine·HCl
0.001 M benzoyl-L-arginine ethyl ester The substrate solution was then adjusted to pH 6.2 by 2 N aqueous sodium hydroxide solution and pumped through the packed papain-cotton reactor prepared in Example 3, above, at a rate of 12 milliliters per minute. Hydrolysis of the substrate was monitored by measuring absorbance of the substrate effluent at 253 nm.

Hydrolysis at the 12 ml./min. feed rate was observed to be steady at about 54 percent over a time period of 1.5 hours.

After a time period of two weeks enzymatic activity of the reactor was reevaluated. Hydrolysis at a feed rate of 6 milliliters per minute was observed to be steady at 82 percent over a 45-minute time period and hydrolysis at a feed rate of 12 milliliters per minute was observed to be steady at 55 percent over a time period of 30 minutes.

EXAMPLE 5

Coupling of papain and hexamethylene diamine-treated cotton with dimethyladipimidate A reactor was prepared by packing hexamethylene diamine-treated cotton (10 grams) into a stainless steel nipple (1" I.D. x 3") with stainless steel caps provided with plastic tubing fittings and plastic porous discs as fiber retainers fitted at each end of the nipple.

Purified papain (2.0 grams) was dissolved in water (100 milliliters), the solution adjusted to pH 10 by 1 N aqueous sodium hydroxide solution, and then circulated through the packed reactor for five minutes at a rate of 132 milliliters per minute.

Dimethyladipimidate (2.0 grams) was added in dry form and with stirring to the recirculating papain solution over a two-minute interval and while pH of the recirculating solution was maintained at 10 by the addition of 1 N aqueous sodium hydroxide solution. After addition of dimethyladipimidate was completed the solution was stirred and recirculated through the packed reactor for 30 minutes with pH maintained at 10 by the addition of 3 N aqueous solution of hydrochloric acid.

Thereafter the packed reactor was washed by recirculation for five minutes with three two-liter aliquots of water.

Enzymatic activity of the thus-prepared reactor was evaluated using a benzoyl-L-arginine ethyl ester solution prepared in the same manner as in Example 4, above. The solution was pumped through the reactor at a steady rate and hydrolysis of the substrate was monitored by measuring absorbance at 253 nm. The experimental data are compiled in Table I, below.

TABLE I

| Flow rate, ml./minutes | Time from start, minutes | Percent hydrolysis of substrate |
|---|---|---|
| 6 | 240 | 96 |
| 12 | 20 | 78 |
| 12 | 45 | 78 |
| 12 | 60 | 76 |

No apparent wash-off of papain from the cotton matrix was observed at either flow rate.

EXAMPLE 6

Activation of cotton with cyanogen bromide

Cyanogen bromide (50 grams) and cold water (2 liters) were combined in a four-liter stainless steel breaker placed in an ice bath. pH of the solution was adjusted to the range of 11 to 12.5 by the addition of 2 N aqueous sodium hydroxide solution. The resulting solution was stirred at low speed with an electrical mixer equipped with two stainless steel paddles 2" x 1.5" and chopped clean cotton roving (50 grams) added thereto.

After the addition of cotton was complete, stirring was continued for a time period of 50 minutes while pH of the solution was maintained in the range of 11.5 to 12.2 using 390 milliliters of 2 N aqueous sodium hydroxide solution. Ultimately pH stabilized at 11.9.

Thereafter the resulting BrCN-activated cotton was washed in an ice bath eight times with two-liter aliquots of cold water (5° C.–10° C.) with intermittent stirring and with filtering between washes, and then four times with two-liter aliquots of 0.1 M aqueous sodium bicarbonate solution, again with intermittent stirring and with filtering between washes. Final pH was observed to be 8.1.

EXAMPLE 7

Attachment of polyethyleneimine to BrCN-treated cotton

Cold, washed cotton treated with BrCN as set forth in Example 6, above, was added to polyethyleneimine (M.W. 1800, proportion of primary, secondary and tertiary amino groups 1:2:1, respectively) (100 grams) in 0.1 M aqueous sodium bicarbonate solution (2 liters). pH of the solution was adjusted to 8.4 using 4 N HCl prior to the addition of the treated cotton. After the cotton addition was completed the resulting admixture was stirred in an ice bath for 30 minutes. Final pH was observed to be 8.5.

Thereafter the polyethyleneimine-treated cotton was washed with intermittent stirring and with filtering after each wash cycle. A two-liter aliquot of wash solution was used each time. The following wash sequence was employed:

(a) water—four times
(b) 0.05 N HCl—twice
(c) water—twice
(d) 0.1 M $NaHCO_3$—twice
(e) water—twice
(f) 1 M NaCl—twice
(g) water—twice
(h) acetone—four times After washing, the polyethyleneimine-treated cotton was dried for about 16 hours at 50° C. in a vacuum oven. Crocein Scarlet Moo dye test for the presence of amino groups on the dried cotton was positive. Yield: 47 grams.

A sample of the polyethyleneimine-treated cotton was analyzed for nitrogen. An average nitrogen content of about 1.30 percent by weight was found.

EXAMPLE 8

Crosslinking of papain and polyethyleneimine-treated cotton

A reactor was prepared by packing polyethyleneimine-treated cotton (10 grams) into a stainless steel nipple (1" I.D. x 3") with stainless steel caps provided with plastic tubing fittings and plastic porous discs as fiber retainers fitted at each end of the nipple.

Purified papain (2.0 grams) was dissolved in water (100 milliliters), pH of the solution was adjusted to 6.1 by the addition of dilute aqueous sodium hydroxide solution, and the solution then circulated through the packed reactor at a rate of 132 milliliters per minute. During initial circulation pH of the solution was observed to rise from 6.1 to 7.1.

Dimethyladipimidate (2.0 grams) was then added dry to the circulating solution over a five-minute interval while maintaining the solution at a pH of 10 by addition of 1 N aqueous sodium hydroxide solution. After dimethyladipimidate addition was completed, the solution was recirculated for an additional 50 minutes and pH was maintained at 10 by the addition of 3 N aqueous hydrochloric acid solution.

Thereafter the packed cotton was washed three times with two-liter aliquots of water by recirculation for five minutes each at a rate of 132 milliliters per minute. The spent recirculating solution and the wash solutions were then checked for the presence of papain by measuring absorbance of the solutions at 280 nm. The obtained results are presented in Table II, below.

TABLE II

| Solution | Volume, ml. | $A_{280}$ | at dilution | pH |
|---|---|---|---|---|
| Spent recirculated solution | 65 | 0.928 | 1:100 | 9.4 |
| Do | 65 | 0.390 | 1:250 | |
| First wash | 1,980 | 0.666 | 1:5 | |
| Second wash | 1,920 | 0.154 | 1:1 | |
| Third wash | 1,900 | 0.027 | 1:1 | |

EXAMPLE 9

Evaluation of enzymatic activity of papain cross-linked to polyethyleneimine-treated cotton Enzymatic activity of the reactor prepared in Example 8 was evaluated using a benzoyl-L-arginine ethyl ester solution prepared in the same manner as in Example 4, above. The solution was pumped through the reactor at a steady rate and hydrolysis of the substrate was monitored by measuring absorbance at 253 nm in a 0.1 mm. cell.

The experimental data are compiled in Table III, below.

TABLE III

| Flow rate, ml./minutes | Time from start, minutes | Percent hydrolysis of substrate |
|---|---|---|
| 12 | 30 | 56 |
| 12 | 45 | 60 |
| 12 | 60 | 60 |
| 12 | 70 | 60 |
| 6 | 70–270 | [1] 85 |

[1] Steady

Hydrolysis rates during the foregoing test runs were steady and no wash-off of the papain was observed.

The foregoing discussion and the examples are intended as illustrative but are not to be construed as limiting. Still other variations within the spirit and scope of the present invention are possible and will readily present themselves to one skilled in the art.

We claim:

1. An enzymatically-active, water-insoluble composite which comprises fibrous cellulose, a polyamine covalently attached to the cellulose by a carbamic linkage, and an active enzyme crosslinked to the polyamine by an alkylene diamidine linkage containing 3 to 10 carbon atoms, inclusive, in the alkylene portion thereof.

2. The enzymtically-active composite of claim 1 wherein the enzyme is papain.

3. The enzymatically-active composite of claim 1 wherein the polyamine is hexamethylene diamine.

4. The enzymatically-active composite of claim 1 wherein the polyamine is polyethyleneimine having a molecular weight of about 1800 and the primary, secondary and tertiary amino groups thereof being present in the proportion of about 1:2:1, respectively.

5. The enzymatically-active composite of claim 1 wherein the alkylene diamidine linkage is tetramethylene diamidine.

6. A method for producing an enzymatically-active, water-insoluble composite which comprises reacting in an aqueous medium fibrous cellulose with a cyanogen halide which is a member of the group consisting of cyanogen bromide and cyanogen chloride to produce a pendant iminocarbonic acid ester group on the cellulose, reacting the iminocarbonic acid ester group with a polyamine to covalently attach said polyamine to said cellulose by means of a carbamic linkage, and thereafter coupling a free primary amino group of the attached polyamine and an amino group of an active enzyme and said polyamine.

7. The method in accordance with claim 6 wherein the enzyme is papain.

8. The method in accordance with claim 6 wherein the polyamine is hexamethylene diamine.

9. The method in accordance with claim 6 wherein the polyamine is polyethyleneimine having a molecular weight of about 1800 and the primary, secondary and tertiary amino groups thereof being present in the proportion of about 1:2:1, respectively.

10. The method in accordance with claim 6 wherein the lower alkyl ester of saturated aliphatic diimidic acid is dimethyladipimidate.

References Cited

UNITED STATES PATENTS

| 3,645,852 | 2/1972 | Axen et al. | 195—63 X |
| 3,669,841 | 6/1972 | Miller | 195—63 |
| 3,706,633 | 12/1972 | Katchalski et al. | 195—63 |

DAVID M. NAFF, Primary Examiner

U.S. Cl. X.R.

195—68, DIG. 11

UNITED STATES PATENT OFFICE
CERTIFICATE OF CORRECTION

Patent No. 3,741,871         Dated June 26, 1973

Inventor(s) Lloyd Weeks, et al.

It is certified that error appears in the above-identified patent and that said Letters Patent are hereby corrected as shown below:

Col. 1, line 72:  "minimzed" should read ---minimized---.

Col. 3, line 14:  "pentamethylene, diamine" should read ---pentamethylene diamine---.

Col. 3, line 44:  "succinimide" should read ---succinimidic---.

Col. 6, line 6:  "acetone was" should read ---acetone wash---.

Col. 7, line 48:  "steel breaker" should read ---steel beaker---

Col.10, Claim 6, line 12:  "enzyme and said polyamine" should read: ---enzyme which is not essential for enzymatic activity by means of a lower alkyl diester of saturated aliphatic diimidic acid to form an alkylene diamidine linkage between said enzyme and said polyamine---.

Signed and sealed this 14th day of May 1974.

(SEAL)
Attest:

EDWARD M. FLETCHER, JR.
Attesting Officer

C. MARSHALL DANN
Commissioner of Patents